(12) United States Patent
Harmann et al.

(10) Patent No.: US 12,467,817 B2
(45) Date of Patent: Nov. 11, 2025

(54) PIEZO-RESISTIVE PRESSURE CELL WITH REDUCED RADIATION INDUCED DRIFTS UNDER HIGH-ENERGY RADIATION

(71) Applicant: AST Advanced Space Technologies GmbH, Osterholz-Scharmbeck (DE)

(72) Inventors: Hans-Peter Harmann, Hambergen (DE); Heiko Dartsch, Bremen (DE); Kyra Bekaan, Bremen (DE)

(73) Assignee: AST Advanced Space Technologies GmbH, Osterholz-Scharmbeck (DE)

( * ) Notice: Subject to any disclaimer, the term of this patent is extended or adjusted under 35 U.S.C. 154(b) by 299 days.

(21) Appl. No.: 18/134,759

(22) Filed: Apr. 14, 2023

(65) Prior Publication Data
US 2023/0332971 A1 Oct. 19, 2023

(30) Foreign Application Priority Data
Apr. 14, 2022 (EP) .................................. 22168620

(51) Int. Cl.
*G01L 27/00* (2006.01)
*G01L 9/04* (2006.01)
*G01L 9/06* (2006.01)

(52) U.S. Cl.
CPC ............ *G01L 27/005* (2013.01); *G01L 9/045* (2013.01); *G01L 9/065* (2013.01)

(58) Field of Classification Search
CPC . G01L 19/147; G01L 9/0072; G01L 19/0645; G01L 19/0084; G01L 13/025; G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052;
(Continued)

(56) References Cited

U.S. PATENT DOCUMENTS 4,976,266 A * 12/1990 Huffman ................. G01T 1/161
250/371
4,994,781 A * 2/1991 Sahagen ............... G01L 9/0055
338/42

FOREIGN PATENT DOCUMENTS

KR 20210098474 A * 8/2021
WO WO-2022140615 A1 * 6/2022 ............. G01N 21/65

OTHER PUBLICATIONS

Belwanshi, Vinod, Sebin Philip, and Anita Topkar. "Gamma radiation induced effects on the performance of piezoresistive pressure sensors fabricated using different technologies." IEEE Transactions on Nuclear Science 66.9 (2019): 2055-2062.
(Continued)

*Primary Examiner* — Andre J Allen
(74) *Attorney, Agent, or Firm* — Cesari and McKenna, LLP

(57) ABSTRACT

The invention relates to relates to a pressure cell configured for working according to the piezo-resistive principle and for use under high-energy radiation, particularly for use in space, i.e. to work under cosmic radiation. In order to reduce radiation drift effects during operation of the pressure cell, the pressure cell is treated with a radiation hardening procedure comprising an exposing of the cell with a radiation dose up to a saturation range of a radiation drift curve or above.

19 Claims, 4 Drawing Sheets

(58) Field of Classification Search
CPC ....... G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 9/0076; G01L 7/08; G01L 9/0025; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/00; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC .................................................. 73/700–756

See application file for complete search history.

(56) References Cited

OTHER PUBLICATIONS

Bogue, Robert. "Radiation hardening and sensors for radioactive environments." Sensor Review 33.3 (2013): 191-196.

EP Search Report, mailed Sep. 21, 2022, for European Patent Application No. 22168620.7, 9 pages.

Holbert, Keith E., et al. "Response of piezoresistive MEMS accelerometers and pressure transducers to high gamma dose." IEEE Transactions on Nuclear Science 50.6 (2003): 1852-1859.

Hashemian, H M: "On-line Monitoring and Calibration Techniques in Nuclear Power Plants", Jan. 1, 2010; retrieved from the internet: URL:https://www-pub-iaea.org/MTCD/publications/PDF/P1500_CD_WEB/htm/pdf/topic7/7S05_H.Hashemian.pdf, 11 pages.

* cited by examiner

PIEZO-RESISTIVE PRESSURE CELL WITH REDUCED RADIATION INDUCED DRIFTS UNDER HIGH-ENERGY RADIATION

CROSS-REFERENCE TO RELATED APPLICATIONS

The present application claims the benefit of European Patent Application Serial No. 22168620.7, which was filed on Apr. 14, 2022, by Hans-Peter Harmann, et al. for PIEZO-RESISTIVE PRESSURE CELL WITH REDUCED RADIATION INDUCED DRIFTS UNDER HIGH ENERGY RADIATION, which is hereby incorporated by reference.

BACKGROUND OF THE INVENTION

The present invention relates to a pressure cell configured for working by the piezo-resistive principle and for use under high-energy radiation.

Piezo-resistive pressure sensors show radiation dependent and temperature dependent drifts of sensor sensitivity (also referred to as gain) and offset. By way of example, calibration and control of these drifts is of particular relevance in extreme environments such as in space-based applications where components often have to cope with severe bombardment by cosmic radiation and with temperature changes from well below minus 100 degrees to well above 100 degrees.

In any space mission from low Earth orbits to deep space background radiation from space is a major factor that must be considered. In general, electrical components are sensitive to ionizing radiation and sensor components can suffer from a significant loss in accuracy induced by radiation exposure. For example, the maximum annual dose with four millimeter aluminum shielding is approximately five krad. Components installed outside a spacecraft have much less shielding and are exposed to doses of several 100 krad up to the Mrad range.

For example, for a mission of ten years in low Earth orbit a dose of up to 40 krad can be assumed considering intrinsic instrument shielding, wherein pressure sensors are some of the most radiation-sensitive components.

Radiation dependent and temperature dependent drifts (often simply referred to as radiation drift and temperature drift) lead to the total error increasing compared to the delivery status, wherein at a certain point in time requirements for accuracy can no longer be met. This point in time defines the end of use (lifetime) for the defined purpose.

Various approaches are known in the prior art to increase lifetime of pressure sensors under the influence of radiation, e.g. by a choice of materials with higher radiation resistance, using geometric sensor structures with less influence of drift, and numerical compensation of the drift.

Choosing specific materials (e.g. including so-called hardening) and using special geometric sensor structures often come with an increased effort while targeting markets with small volumes. Mathematical compensation requires active electronics, which in turn are susceptible to radiation aging and radiation defects.

A common approach in the prior art involves assembly, testing, and storage of the pressure sensors with an exposure to radiation that is as low as possible. For example, pressure sensors are thermally aged under low radiation exposure and then precisely measured. Then, compensation resistances (in the case of passive temperature compensation) or coefficients of a compensation equation for numerical compensation are determined for the temperature operating point based on the measurement data. With these values, a compensation circuit is built or the coefficients are stored. Typically, the compensation involves calibrating a curve of a temperature-related deviation to have a zero point at the operating temperature of the sensor. After calibration sensor is checked and the resulting temperature characteristic is measured against the calculated characteristic. During this calibration process (and also during the lifetime of the sensor) a low radiation environment is required because exposure to radiation shifts the sensitivity, the offset, and the optimum temperature compensation (drift of the temperature operating point due to shifting of the curve and thus the zero point of the temperature compensation). This means that even in case sensitivity drift is slow, sooner or later the sensor runs out of its specs and no longer maintains its accuracy as delivered.

In other words, the sensor is no longer usable because at some point in time its calibration is defective in relation to the initial assumptions. This is often referred to as the so-called failure criterion. For example, a sensor may be calibrated for a 2% error band (deviation of the total error), wherein with a certain radiation dose, the sensor runs out of the specified error band and is therefore defective. One technical solution so far has been to compensate for the change numerically and thus be able to operate the sensor for longer. However, such compensation is often limited.

BRIEF SUMMARY OF THE INVENTION

It is therefore an object of the present invention to provide pressure sensor configured for working by the piezo-resistive principle and for use under high-energy radiation, which overcomes deficiencies of the prior art.

A particular object is to provide a pressure sensor with an increased lifetime under extreme conditions, particularly for space applications.

A further object is to provide a pressure sensor, which can be operated within its accuracy class defined at delivery longer or even indefinitely.

These objects are achieved by the realization of at least part of the characterizing features of the independent claims. Features which further develop the invention in an alternative or advantageous manner are described in some of the other features of the independent claims and in the dependent claims.

The invention is based on utilizing a saturation property of the pressure cell to be used for a pressure sensor. New measurements have shown that with increasing total radiation dose radiation aging of pressure cells goes into so-called saturation, i.e. the radiation drift of a change in sensitivity and a change in offset asymptotically approaches a limit value with increasing radiation dose of high-energy radiation exhibited on the pressure cell. This opens up the possibility of pre-irradiating pressure cells to minimize drift effects. One aspect of the invention thus relates to a method for generating a pressure cell for a pressure sensor by aging the cell through targeted irradiation in order to reach the saturation range, and thus to stabilize the pressure cell in the delivery state with regard to remaining radiation drift. By way of example, for a specific type of pressure cell measurements have shown that irradiation by gamma radiation permanently reduce radiation drift effects to small contributions such that errors by radiation drifts fall below other then more dominant error sources.

The invention relates to a method for generating a pressure cell configured for working according to the piezoresistive principle and for use under high-energy radiation. By way of example, the pressure cell is configured for use under at least of high-energy electromagnetic radiation, e.g. gamma radiation or X-radiation, high-energy particle radiation, e.g. neutron or proton radiation. The high-energy radiation may be ionizing radiation or non-ionizing radiation. In particular, the pressure cell is configured for use in space, i.e. to work under cosmic radiation.

The pressure cell is of the type that exhibits a radiation-induced drift of at least one of a change in sensitivity of the pressure cell and a change in an offset measurement parameter of the pressure cell as a function of a radiation dose of high-energy radiation exhibited on the pressure cell.

The method comprises an exposing of the pressure cell with a radiation dose of high-energy radiation up to a start of a saturation range (or above) of the radiation-induced drift, wherein the radiation-induced drift asymptotically approaches within the saturation range a limit value with increasing radiation dose of high-energy radiation exhibited on the pressure cell. In particular, the method further comprises a determining of a calibration parameter taking into account the sensitivity of the pressure cell and/or the offset measurement parameter of the pressure cell after the exposing of the pressure cell with the radiation dose up to the saturation range.

By way of example, in a representation of the radiation-induced drift as a radiation drift curve providing on one axis the induced irradiation by the high-energy radiation and on the other axis the change in sensitivity of the pressure cell or the change in the offset measurement parameter of the pressure cell, the saturation range is provided with respect to a band between the limit value and a value of the radiation drift curve corresponding to a state of the pressure cell free of irradiation by the high-energy radiation, wherein the saturation range is defined as the range where the radiation drift curve is less than 50 percent, particularly less than 35 percent, of the bandwidth of the band away from the limit value. In other words, the drift value due to radiation aging shall be at least 50% (in particular at least 65%) of the limit drift value so as to be in the saturation range.

In one embodiment, the method comprises a providing—for a nominal pressure to be measured by the pressure cell or for a nominal working range of the pressure cell—of a radiation drift curve representing the radiation-induced drift of the pressure cell, wherein the radiation drift curve is provided to extend over a so-called saturation range in which the at least one radiation drift curve asymptotically approaches a limit value with increasing radiation dose of the high-energy radiation exhibited on the pressure cell. The pressure cell is then irradiated with high-energy radiation such that the pressure cell is exposed with a radiation dose up to the saturation range or above.

The total dose to be applied depends on the pressure class and the desired accuracy class of the pressure cell. By way of example, measurements for a silicone cell of a Wheatstone Bridge design and configured for four bar nominal pressure measurement have shown that irradiation by 100 krad (Si) gamma radiation reduces expected radiation drift in sensitivity below 0.5%. Thus, a cell having 0.5% accuracy without radiation influence would thus be in the 1% class for radiation use. After irradiation with 200 krad (Si) the same cell would be suitable for the 0.75% class. For an equivalent cell laid out for nominal pressure measurement of 350 bar the required radiation dose for generating a total error below 1% have shown to be 140 krad (Si) and 200 krad (Si) for 0.75% total error. For these types of pressure cells irradiation with radiation doses above 250 krad (Si) showed a drop of radiation drift effects below then other more dominant error sources, e.g. introduced by temperature drifts, aging over time, detector noise, background noise, etc.

In one embodiment, the method further comprises a using of a radiation drift curve representing the radiation-induced drift to determine within the saturation range a minimal radiation dose required to limit further drift of the change in pressure measurement sensitivity and/or further drift of the change in the pressure measurement offset parameter below a pre-defined maximum value as the radiation dose increases. The pre-defined maximum value is associated with an allowed maximum error caused by the further drift of the change in pressure measurement sensitivity and/or by the further drift of the change in the pressure measurement offset parameter in a pressure measurement by the pressure cell. For example, the pre-defined maximum value is determined by finding on the radiation drift curve the (absolute) dose value which exactly lies a desired amount below the (absolute) limit value. The exposing of the pressure cell then comprises an exposing of the pressure cell with the required minimal radiation dose, e.g. to ensure maintenance of pressure measurement within a pre-defined error band.

In a further embodiment, the method comprises a using of the radiation drift curve to determine within the saturation range a maximal radiation dose above which a total further drift of the change in pressure measurement sensitivity and/or a further total drift of the change in the pressure measurement offset parameter is below a pre-defined minimal value associated with an allowable minimum error caused by the further drift of the change in pressure measurement sensitivity and/or the further drift of the change in the pressure measurement parameter in a pressure measurement by the pressure cell as the radiation dose increases. Thus, for the exposing of the pressure cell the radiation dose can be kept below the maximal radiation dose, e.g. to avoid unnecessary aging radiation aging in light of other then more dominant error sources.

In a further embodiment, the method comprises a determining of a thermal compensation parameter for a temperature operating point of the pressure cell, wherein the exposing of the pressure cell with the radiation dose up to the start of the saturation range or above is carried out before the determining of the thermal compensation parameter for the temperature operating point. For example, the thermal compensation parameter is a compensation resistance of the pressure cell for a compensation of a temperature-related deviation of a pressure measurement provided by the pressure cell or a coefficient of a compensation equation for a numerical compensation of a temperature-related deviation of a pressure measurement provided by the pressure cell.

By way of example, the exposing of the pressure cell with the radiation dose up to the start of the saturation range before the determining of the thermal compensation parameter provides the benefit of (automatically) taking into account drift of the temperature operating point due to radiation drift, e.g. such that a set zero point of the temperature compensation remains stable under future radiation exposure.

In a further embodiment, the method comprises a subjecting of the pressure cell to a thermal aging process, which is carried out before the exposing of the pressure cell with the radiation dose up to the start of the saturation range. For example, the pressure cell is kept at a maximum temperature for a defined period of time, e.g. several days. The determining of the thermal compensation parameter for the temperature operating point then takes place after both the subjecting to the thermal aging process and the exposing of the pressure cell with the radiation dose up to the saturation range.

In a further embodiment, the method comprises a providing of the above mentioned radiation drift curve based on a measurement of a resistance value of the pressure cell. By way of example, the providing of the radiation drift curve comprises a determining of the resistance value, while the pressure cell is pressurized and irradiated by the high-energy radiation.

For example, the pressure cell is operated continuously by supplying it with a nominal current and is cyclically pressurized during the entire irradiation time by the high-energy radiation, e.g. to four different pressure levels.

The invention further relates to a pressure cell, configured to work according to the piezo-resistive principle and for use under high-energy radiation, wherein the pressure cell comprises a stored calibration parameter taking into account a sensitivity of the pressure cell and/or an offset measurement parameter of the pressure cell, wherein the stored calibration parameter has been determined in accordance with a method according to one of the embodiments described above.

Once the pressure cell has been exposed to the radiation dose up to the saturation range, further drift is small and often negligible, e.g. because errors introduced by this further drift fall below other more dominant error sources. Thanks to the radiation aging as described above, the pressure cell may thus be free of further calibration parameters for the sensitivity and/or the offset measurement parameter, e.g. which may be used in an attempt to numerically take into account ongoing radiation drift or estimations of further radiation drift influence. In other words, the once determined calibration parameters can be fixed without requiring adaptive adjustments on an increased radiation dose.

The invention further relates to a pressure cell, configured to work by the piezo-resistive principle and for use under high-energy radiation, wherein the pressure cell is generated by a method according to one of the embodiments described above.

In one embodiment, the pressure cell is embodied by four resistors diffused in a sensor substrate, wherein the four resistors are connected together to a half open Wheatstone Bridge. By way of example, the resistors are mechanically loaded and configured to change their conductivity under deformation, wherein the resistors are arranged in a way that two of them increase their values when pressure is applied and the other two decrease their values when pressure is applied.

In a further embodiment, the pressure cell is based on a silicon substrate and configured to provide a nominal pressure to be measured below ten bar, wherein for the step of exposing the pressure cell with a radiation dose up to the start of the saturation range, the pressure cell was exposed to 100 krad (Si), particularly 200 krad (Si), of gamma radiation.

In a further embodiment, the pressure cell is based on a silicon substrate and configured to provide a nominal pressure to be measured above 200 bar, wherein for the step of exposing the pressure cell with a radiation dose up to the start of the saturation range, the pressure cell was exposed to 140 krad (Si), particularly 200 krad (Si), of gamma radiation.

In particular, for the step of exposing the pressure cell with a radiation dose up to the start of the saturation range, the pressure cell was exposed to less than 250 krad (Si) gamma radiation.

In a further embodiment, a minimal radiation dose was determined as described above, in order to provide for an allowable maximum error of 0.5%, particularly 0.3%, caused by the further drift of the change in pressure measurement sensitivity and/or the further drift of the change of the offset measurement parameter in a pressure measurement by the pressure cell as the radiation dose increases.

The invention further relates to a use of a pressure cell generated by a method according to one of the embodiments described above for a pressure measurement under high-energy radiation onto the pressure cell, e.g. wherein the pressure cell is used in space.

The invention further relates to a pressure sensor configured for use under high-energy radiation, particularly at least one of high-energy electromagnetic radiation, high-energy particle radiation, and high-energy ionizing radiation, more particularly for use in space, wherein the pressure sensor comprises a pressure cell according to one of the embodiments described above.

BRIEF DESCRIPTION OF THE DRAWINGS

The method, the pressure cell, and the pressure sensor according to the different aspects of the invention are described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically.

DETAILED DESCRIPTION OF THE INVENTION

Figure 1:
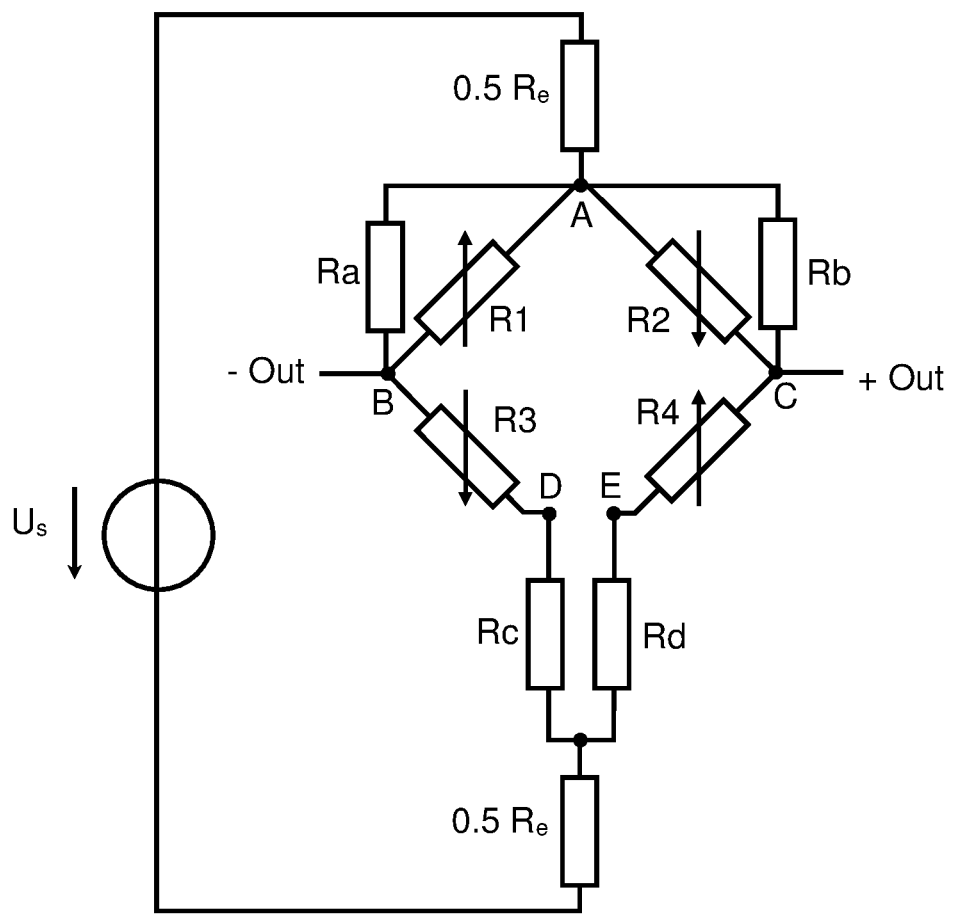
FIG. 1: an electronic circuit diagram of an exemplary embodiment of the pressure cell in the form of a Wheatstone Bridge.
Figure 2:
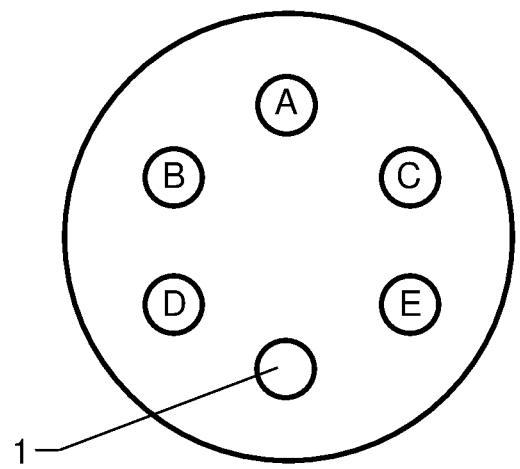
FIG. 2: a schematic top view onto a pressure cell according to the electronic circuit diagram of FIG. 1.

FIG. 1 depicts an electronic circuit diagram of an exemplary embodiment of the pressure cell in the form of a Wheatstone Bridge and FIG. 2 gives a schematic top view onto a pressure cell being configured to have the electronic connections depicted by FIG. 1.

The sensing elements are passive bridge type sensors, wherein the sensor cells do not contain any active electronics. Thus, low dose rate sensitivity (ELDRS) does not have to be considered. The sensor circuit consists of a Wheatstone bridge (R1-R4) and additional resistors connected in series or parallel (Ra-Re). The additional resistors are used to reduce the initial sensor offset as well as the temperature dependent drift of sensor sensitivity and offset. During manufacturing, for each individual sensor cell the corresponding resistance values are determined by high-precision measurements over pressure and temperature. The fixed value resistors (Ra-Re) used are surface mounted thick film resistors. This resistor technology is known to be insensitive to radiation, which was also confirmed by a dedicated test conducted in the frame of the performed irradiation campaign for a TID (Total Ionizing Dose) of up to 40 Mrad.

The four resistors are diffused in a silicon die on the chip. This chip is mounted on a thin glass plate. If pressure is applied on the chip, the resistors are mechanically loaded and change their conductivity. In the example shown, the resistors are arranged in a way that two of them increase their values when pressure is applied. The other two decrease their values when pressure is applied.

By way of example, the pressure cell is based on an oil-filled system, wherein the ball 1 is welded in the housing to close the oil fill hole. The applied pressure presses on the membrane. This transmits the force to the oil filling and a ceramic body. The ceramic body is used to reduce the oil volume and thus reduces the temperature drift of the sensor. At the end, the force is transmitted to the chip. Thus, the chip is mechanical loads exposed, which compress or stretch the in silicon diffused resistors. Due to these loads, the resistors change their conductivity.

In order to determine the at least one radiation drift curve, for example, the pressure cell is operated continuously by supplying it with nominal current. During this process, measurements are carried out at different pressure levels. To be able to read the cell continuously during the irradiation time, the cell is electrically connected and equipped with a fluidic connection so that it can be cyclically pressurized during the entire irradiation time.

Figure 3:
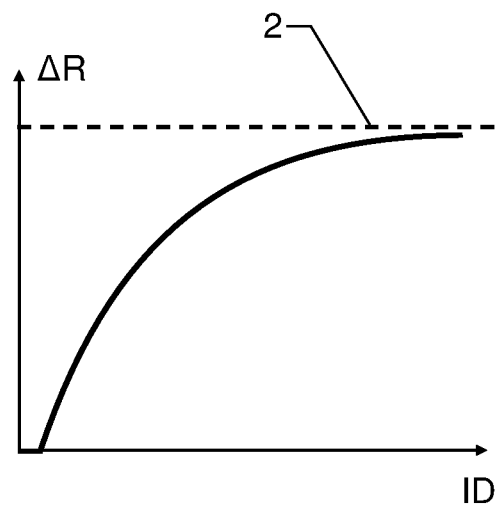
FIG. 3: an exemplary dependence of a change in resistance as a function of radiation dose of a resistor of a pressure cell embodied according to FIG. 1.

FIG. 3 depicts an exemplary dependence of a change in resistance OR of one of the resistors shown by the electronic circuit diagram of FIG. 1 as function of irradiated gamma radiation dose ID up to a TID of 240 krad. For example, typical values for the TID in space mission products at low Earth orbit are between 5-50 krad.

Referring to a pressure cell of the type described with reference to FIGS. 1 and 2, the four installed resistors in the form of strain gauges show a change in value with increasing radiation, due to the physical change of the installed sensing element of the cell. Depending on the applied pressure, the individual values of the resistors differ more or less from each other, but each resistor shows the same effects when irradiated, which is also reflected in the sensitivity and offset (see FIG. 4).

The radiation drift asymptotically approaches a limit 2 with increasing radiation dose of high-energy radiation exhibited on the resistor.

By way of example, tests showed that for a nominal pressure measurement range of 4 bar the individual resistances increase by about 1.7 over the complete dose of 240 krad. For a nominal pressure measurement range of 350 bar, the pressure cell shows similar behavior, but the maximum relative change in resistance after a TID of 240 krad is significantly higher than the 4-bar cell with about 2.4% change.

Figure 4:
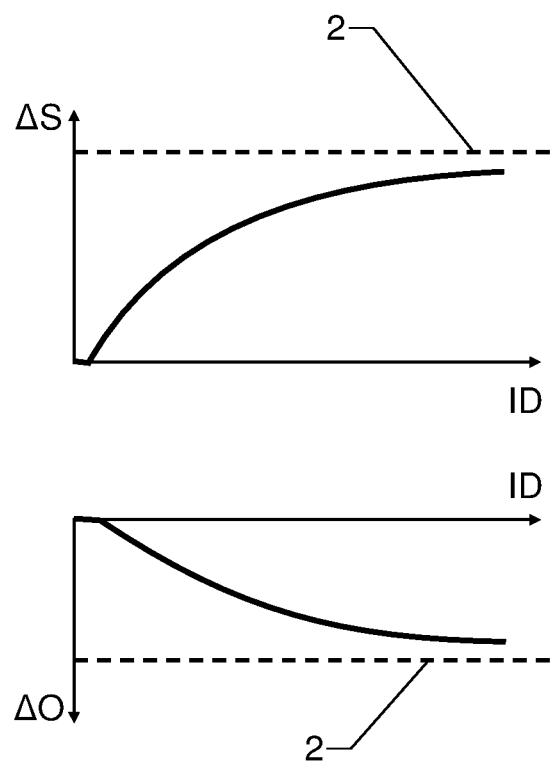
FIG. 4: an exemplary dependence of a change in sensitivity (top) and a change in offset (bottom) as a function of radiation dose of a pressure cell embodied according to FIG. 1.

FIG. 4 depicts an exemplary dependence of a change in sensitivity $\Delta S$ (top) and a change in offset $\Delta O$ (bottom) as a function of radiation dose ID of a pressure cell embodied according to FIG. 1. Similar to the radiation drift curve for the resistance, a saturation effect can be observed, where the respective radiation drift curves asymptotically approach a limit 2.

Tests with a pressure cell of the type described with reference to FIGS. 1 and 2 showed that the behavior of a 350-bar cell is very similar to that of a 4-bar cell in terms of sensitivity. The same saturation effect is observed, wherein at the beginning the change in sensitivity increases faster. Moreover, the maximum change in sensitivity in correlation with the change in bridge resistances is also higher. With a TID of 240 krad, the sensitivity changes by more than 2.5%. In contrast to the 4-bar cell, wherein the offset decreases with increasing TID, as schematically depicted in the figure, in case of the 350-bar cell the offset increases with increasing TID. The increase is nearly linear, but at 230 krad a plateau 2 can be observed.

Figure 5:
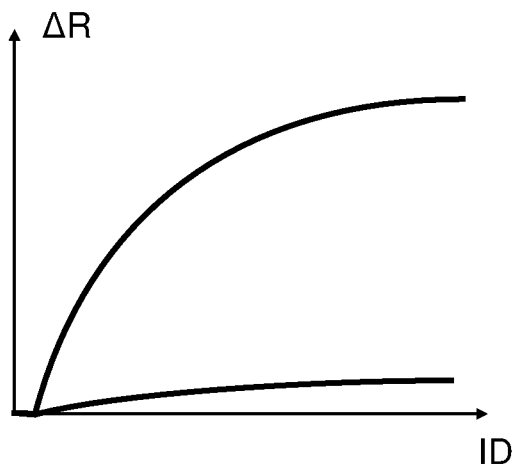
FIG. 5: an exemplary dependence of a change in resistance as a function of radiation dose for a non-pre-irradiated pressure cell and for a pre-irradiated pressure cell.

FIG. 5 depicts an exemplary dependence of a change in resistance $\Delta R$ as a function of radiation dose ID for a non-pre-irradiated pressure cell (upper curve) and for a pre-irradiated pressure cell (lower curve). The pre-irradiated curve benefits from a saturation effect (see FIG. 3), which makes it possible to "harden" the pressure cell with respect to radiation induced effects, i.e., that the pressure cell shows no or at least very small changes with respect to resistance, sensitivity, and offset after having experienced a certain radiation dose.

By way of example, the pre-irradiated radiation drift curve (lower curve) corresponds to a pre-irradiated 4-bar cell that had already been exposed to a TID of 8 Mrad before being irradiated again with a TID of 240 krad. Tests showed that such a pre-irradiated 4-bar cell shows a resistance drift increase by about 0.2% over the complete TID of 240 krad, which is only about 12% of the change without pre-irradiation. Although the change of the individual resistors was significantly higher for the 350-bar cell than for the 4-bar cell (2.4% instead of 1.7%), the change can also be reduced to about 0.2% by pre-irradiation. In this case, this corresponds to only about 8% of the original value.

Figure 6:
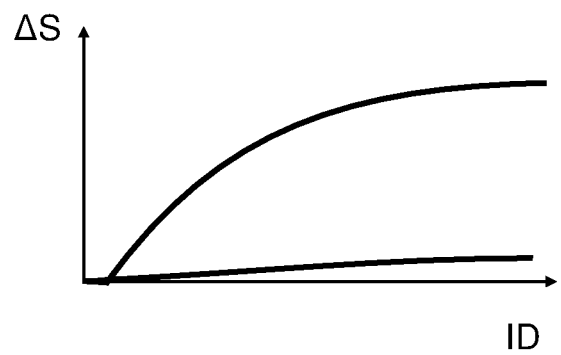
FIG. 6: an exemplary dependence of a change in sensitivity (top) and a change in offset (bottom) as a function of radiation dose for a non-pre-irradiated pressure cell and for a pre-irradiated pressure cell.
Figure 6:
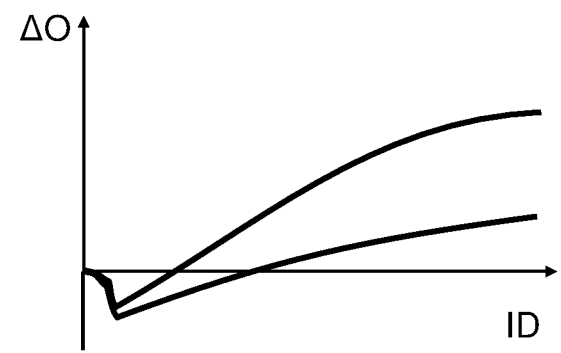

FIG. 6 depicts an exemplary dependence of a change in sensitivity $\Delta S$ (top) and a change in offset $\Delta O$ (bottom) as a function of radiation dose for a non-pre-irradiated pressure cell (upper curves) and for a pre-irradiated pressure cell (lower curves).

Tests showed that the difference in sensitivity is very clear: While the sensitivity of the non-pre-irradiated pressure cells changes by about 1.4% over the entire irradiation period up to a gamma radiation dose of 240 krad, the pre-irradiated cells only change by about 0.15%, i.e. by only one tenth of the originally achieved value.

The sensitivity to gamma radiation can be reduced if the pressure cells are pre-irradiated, which reduces the relative change in sensitivity to about 1/10 of the change in sensitivity with a non-pre-irradiated pressure cell at the same TID.

In case of irradiation with non-ionizing radiation, a small increase in sensitivity and offset can be observed, but this evens out after the end of irradiation.

In summary, it has been shown that the pressure cells are sensitive to gamma radiation but can still withstand a very large dose of radiation (8 Mrad) and show no signs of failure. The impact of radiation-induced effects on the overall reliability of a pressure cell is therefore neglectable.

Figure 7:
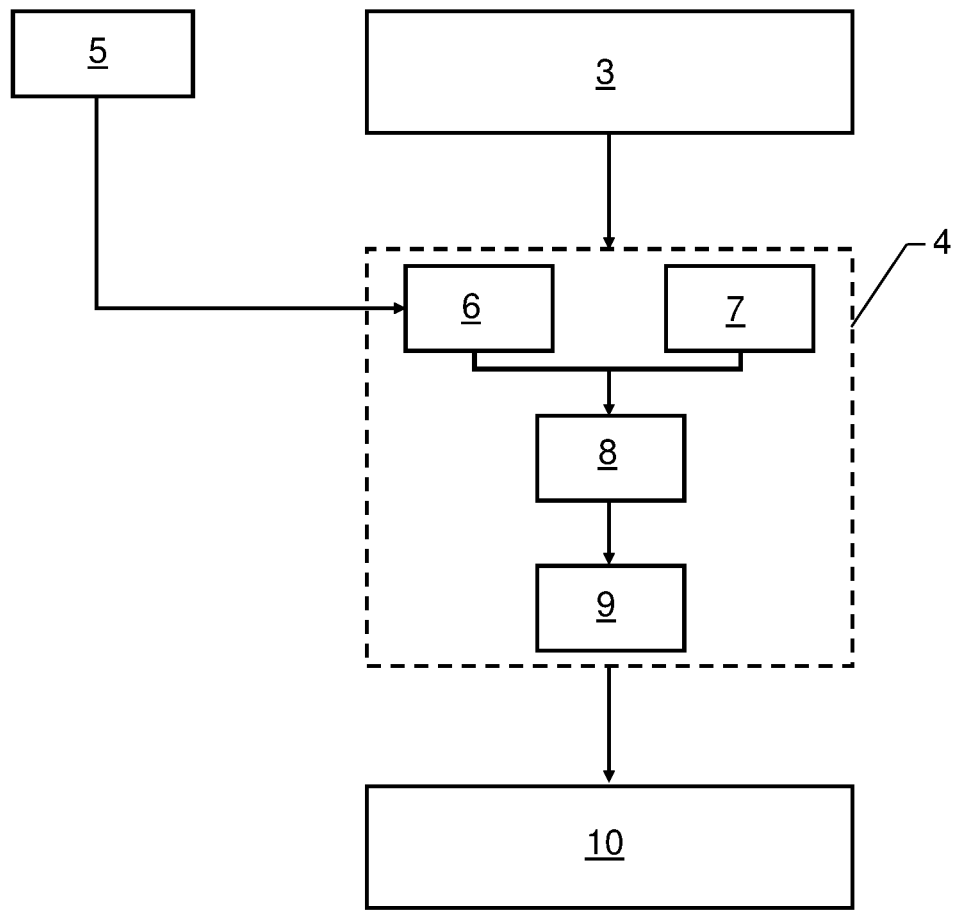
FIG. 7: a block diagram of an exemplary embodiment of the inventive method to generate a pressure cell.

FIG. 7 depicts a block diagram of an exemplary embodiment of the inventive method to generate a pressure cell.

The method comprises a thermal aging step 3, where the pressure cell is kept at a maximum temperature for a defined period of time, e.g. several days. After thermal aging, the pressure cell undergoes a so-called radiation hardening step 4 as described above, i.e. wherein the cell is exposed to high-energy radiation, e.g. gamma radiation, up to a radiation dose in the saturation range of the radiation drift curve, e.g. the sensitivity drift curve.

The method may further include a determination step 5 of determining the radiation drift curve, e.g. as described above. The radiation hardening step 4 then includes a step of providing the radiation drift curve 6 and a step of providing an allowable maximum error 7 caused by a further drift of the change in pressure measurement sensitivity and/or the further drift of the change in the offset measurement parameter in a pressure measurement by the pressure cell as the radiation dose increases. Based on these steps 6, 7, a minimal radiation dose is determined 8, which is required to limit the further drift of the change in pressure measurement sensitivity and/or the further drift of the change in pressure measurement offset below a pre-defined maximum value associated with the allowable maximum error. Then, the pressure cell is exposed to high-energy radiation 9, such that at least the minimal radiation dose is reached.

After the radiation hardening step 4 follows a step of determining of thermal compensation parameters for a temperature operating point of the pressure cell 10. For example, the thermal compensation parameters are compensation resistances of the pressure cell for a compensation of a temperature-related deviation of a pressure measurement provided by the pressure cell or coefficients of a compensation equation for a numerical compensation of a temperature-related deviation of a pressure measurement provided by the pressure cell.

Although the invention is illustrated above, partly with reference to some preferred embodiments, it must be understood that numerous modifications and combinations of different features of the embodiments can be made. All of these modifications lie within the scope of the appended claims.

The invention claimed is:

1. Method for generating a pressure cell configured for working according to the piezo-resistive principle and for use under high-energy radiation, particularly for use under cosmic radiation, wherein the pressure cell is of the type that exhibits a radiation-induced drift of at least one of a change in sensitivity of the pressure cell and a change in an offset measurement parameter of the pressure cell as a function of a radiation dose of high-energy radiation exhibited on the pressure cell, wherein
the method comprises an exposing of the pressure cell with a radiation dose of high-energy radiation up to a start of a saturation range of the radiation-induced drift, wherein the radiation-induced drift asymptotically approaches within the saturation range a limit value with increasing radiation dose of high-energy radiation exhibited on the pressure cell.

2. Method according to claim 1, wherein the method further comprises a determining of a calibration parameter taking into account the sensitivity of the pressure cell and/or the offset measurement parameter of the pressure cell after the exposing of the pressure cell with the radiation dose up to the start of the saturation range.

3. Method according to claim 2, comprising a using of a radiation drift curve representing the radiation-induced drift to determine within the saturation range a minimal radiation dose required to limit further drift of the change in sensitivity and/or the change in the offset measurement parameter below a pre-defined maximum value associated with an allowable maximum error caused by the further drift of the change in sensitivity of the pressure cell and/or the further drift of the change in the offset measurement parameter as the radiation dose increases, wherein the exposing of the pressure cell comprises an exposing of the pressure cell with the minimal radiation dose.

4. Method according to claim 3, comprising a using of the radiation drift curve to determine within the saturation range a maximal radiation dose above which a total further drift of the change in sensitivity and/or a further total drift of the change in the offset measurement parameter is below a pre-defined minimal value associated with an allowable minimum error caused by the further drift of the change in sensitivity and/or the further drift of the change the offset measurement parameter as the radiation dose increases, wherein for the exposing of the pressure cell the radiation dose is kept below the maximal radiation dose.

5. Method according to claim 4, comprising providing of the radiation drift curve based on a measurement of a resistance value of the pressure cell.

6. Method according to claim 5, wherein the providing of the radiation drift curve comprises a determining of the resistance value, while the pressure cell is pressurized and irradiated by the high-energy radiation.

7. Method according to claim 6, wherein the pressure cell is operated continuously by supplying it with a nominal current and is cyclically pressurized during the entire irradiation time by the high-energy radiation.

8. Method according to claim 7, further comprising a determining of a thermal compensation parameter for a temperature operating point of the pressure cell, wherein the exposing of the pressure cell with the radiation dose up to the saturation range is carried out before the determining of the thermal compensation parameter for the temperature operating point.

9. Method according to claim 8, wherein the method comprises a subjecting of the pressure cell to a thermal aging process before the exposing of the pressure cell with the radiation dose up to the start of the saturation range.

10. Pressure cell, configured to work according to the piezo-resistive principle and for use under high-energy radiation, wherein the pressure cell comprises a stored calibration parameter taking into account a sensitivity of the pressure cell and/or an offset measurement parameter of the pressure cell, wherein the stored calibration parameter has been determined by exposing the pressure cell with the radiation dose up to the start of a saturation range.

11. Pressure cell, configured to work according to the piezo-resistive principle and for use under high-energy radiation, wherein the pressure cell is generated by exposing of the pressure cell with a radiation dose of high-energy radiation up to a start of a saturation range of a radiation-induced drift, wherein the radiation-induced drift asymptotically approaches within a saturation range a limit value with increasing radiation dose of high-energy radiation exhibited on the pressure cell.

12. Pressure cell according to claim 11, wherein the pressure cell is embodied by four resistors diffused in a sensor substrate, wherein the four resistors are connected together to a half open Wheatstone Bridge.

13. Pressure cell according to one claim 12, wherein the pressure cell is configured for use under at least one of high-energy electromagnetic radiation, high-energy particle radiation, and high-energy ionizing radiation, particularly for use in space.

14. Pressure cell according to claim 13, wherein the pressure cell is based on a silicon substrate and configured to provide a nominal pressure to be measured below ten bar, wherein for the step of exposing the pressure cell with a radiation dose up to the start of the saturation range according to claim 1, the pressure cell was exposed to 100 krad (Si), particularly 200 krad (Si), of gamma radiation.

15. Pressure cell according to claim 13, wherein the pressure cell is based on a silicon substrate and configured to provide a nominal pressure to be measured above 200 bar, wherein for the step of exposing the pressure cell with a radiation dose up to the start of the saturation range according to claim 1, the pressure cell was exposed to 140 krad (Si), particularly 200 krad (Si), of gamma radiation.

16. Pressure cell according to claim 15, wherein the pressure cell is exposed with a radiation dose up to the start of the saturation range, the pressure cell was exposed to less than 250 krad (Si) gamma radiation.

17. Pressure cell according to claim 16, wherein using of the radiation drift curve to determine within the saturation range a minimal radiation dose, a minimal radiation dose was determined, which provides for an allowable maximum error of 0.5%, particularly 0.3%, caused by the further drift of the change in sensitivity and/or the further drift of the change of the offset measurement parameter as the radiation dose increases.

18. Pressure cell according to claim 17, wherein the pressure cell is for a pressure measurement under high-energy radiation onto the pressure cell, particularly in space.

19. Pressure sensor comprising a pressure cell, configured to work according to the piezo-resistive principle and for use under high-energy radiation, wherein the pressure cell is generated by exposing of the pressure cell with a radiation dose of high-energy radiation up to a start of a saturation range of a radiation-induced drift, wherein the radiation-induced drift asymptotically approaches within a saturation range a limit value with increasing radiation dose of high-energy radiation exhibited on the pressure cell.

\* \* \* \* \*